US010821647B2

(12) United States Patent
Jenzen et al.

(10) Patent No.: US 10,821,647 B2
(45) Date of Patent: Nov. 3, 2020

(54) MANDREL CHAIN WITH MAGNETIC RETENTION (71) Applicant: KHS CORPOPLAST GmbH, Hamburg (DE)

(72) Inventors: Dieter Jenzen, Tornesch (DE); Jan Fabian Meyer, Hamburg (DE); Michael Linke, Hamburg (DE); Dieter Klatt, Hamburg (DE)

(73) Assignee: KHS Corpoplast GmbH, Hamburg (DE)

( * ) Notice: Subject to any disclaimer, the term of this patent is extended or adjusted under 35 U.S.C. 154(b) by 0 days.

(21) Appl. No.: 16/311,768

(22) PCT Filed: Jun. 30, 2017

(86) PCT No.: PCT/EP2017/066348
§ 371 (c)(1),
(2) Date: Dec. 20, 2018

(87) PCT Pub. No.: WO2018/002337
PCT Pub. Date: Jan. 4, 2018

(65) Prior Publication Data
US 2019/0210264 A1 Jul. 11, 2019

(30) Foreign Application Priority Data

Jul. 1, 2016 (DE) .................. 10 2016 112 131

(51) Int. Cl.
*B29C 49/42* (2006.01)
*B29C 49/64* (2006.01)
(Continued)

(52) U.S. Cl.
CPC .......... *B29C 49/4205* (2013.01); *B29C 49/06* (2013.01); *B29C 49/12* (2013.01);
(Continued)

(58) Field of Classification Search
CPC ............ B29C 49/4205; B29C 49/4215; B29C 2049/4226; B29C 49/6409; B29C 49/6418; B29C 49/68
See application file for complete search history.

(56) References Cited

U.S. PATENT DOCUMENTS 4,076,071 A 2/1978 Rosenkranz et al.
5,346,386 A 9/1994 Albrecht et al.
(Continued)

FOREIGN PATENT DOCUMENTS

DE 2352926 A1 4/1975
DE 3639271 A1 5/1988
(Continued)

*Primary Examiner* — Robert B Davis
(74) *Attorney, Agent, or Firm* — Rankin, Hill & Clark LLP (57) ABSTRACT The invention relates to a conveyor system for conveying preforms in a device for blow-forming finished containers, wherein the conveyor system comprises a conveyor chain, the chain links of which comprise a carrying element and a conveyor element, the conveyor system being characterized in that the conveyor element comprises a support structure and the carrying element comprises a mounting structure and at least some sections of the support structure and the mounting structure are designed and arranged to complement one another. Both the support structure of the conveyor element and the mounting structure of the carrying element comprise at least one connecting element, at least some sections of each connecting element being configured and arranged to complement one another, and the conveyor system is further configured to handoff the preforms to carrying elements for conveying said preforms through a heating section and to remove the preforms from the carrying elements after said preforms have been conveyed through the heating section. In addition, the invention also relates to a device for blow-forming finished containers from (Continued)

preforms, in particular from preforms made of a thermoplastic material, the device comprising at least one heating system for thermally conditioning the preforms along a transport path and at least one forming device for forming thermally conditioned preforms into the finished container, characterized in that the device comprises at least one conveyor system for conveying preforms according to the invention, the conveyor system being disposed in particular in the area of the heating device. Lastly, the invention also relates to the use of such a conveyor system and a method for the replacement of at least one carrying element.

14 Claims, 7 Drawing Sheets (51) Int. Cl.
| | | |
|---|---|---|
| B29C 49/06 | (2006.01) | |
| B29C 49/12 | (2006.01) | |
| B29C 49/36 | (2006.01) | |
| B29L 31/00 | (2006.01) | |
| B29K 23/00 | (2006.01) | |
| B29K 67/00 | (2006.01) | |

(52) U.S. Cl.
CPC .......... *B29C 49/36* (2013.01); *B29C 49/6418* (2013.01); *B29C 49/6409* (2013.01); *B29K 2023/12* (2013.01); *B29K 2067/003* (2013.01); *B29L 2031/7158* (2013.01)

(56) References Cited

U.S. PATENT DOCUMENTS

| 5,648,026 | A | 7/1997 | Weiss |
| 2008/0166445 | A1 | 7/2008 | Baumgarte et al. |
| 2010/0013253 | A1 | 1/2010 | Winzinger et al. |
| 2011/0177193 | A1 | 7/2011 | Linke et al. |
| 2014/0044597 | A1 | 2/2014 | Mie |
| 2014/0161924 | A1 | 6/2014 | Linke et al. |
| 2015/0083364 | A1 | 3/2015 | Winzinger |

FOREIGN PATENT DOCUMENTS

| DE | 4212583 | A1 | 10/1993 |
| DE | 4340291 | A1 | 6/1995 |
| DE | 102005011805 | A1 | 1/2007 |
| DE | 102008023701 | A1 | 11/2009 |
| DE | 102008030863 | A1 | 12/2009 |
| DE | 102013109174 | A1 | 2/2015 |
| EP | 2138431 | A1 | 12/2009 |
| EP | 2315654 | B1 | 3/2013 |
| EP | 2753465 | B1 | 8/2016 |
| JP | H1045250 | A | 2/1998 |

MANDREL CHAIN WITH MAGNETIC RETENTION

The invention relates to a conveyor system for conveying preforms in a device for a blow-forming production of finished containers, wherein the conveying system comprises a conveyor chain whose chain links comprises a carrier element and a conveyor element. Furthermore, the invention relates to a device for the blow-forming production of finished containers from preforms and to a use of the conveyor system and a method for replacing at least one carrier element of the conveyor system.

In order to package liquid food and beverages, as a rule containers such as, e.g., glass or plastic bottles are used which are produced in a production process on different devices and are subsequently filled at another device. For example, the production of plastic containers in a blowing device is cited. In a forming of containers by the action of blowing pressure, preforms consisting of a thermoplastic material, for example, preforms of PET (polyethylene terephthalate) are supplied inside a blowing machine to different processing stations. Such a blowing machine typically comprises a heating device and a blowing device in the range of which the previously tempered preform is expanded by a biaxial orientation to a container. The expansion takes place with the aid of compressed air which is introduced into the preform to be expanded and optionally with an additional stretching. The technical methodological course in such an expansion of the preform is explained, for example, in DE-OS 43 40 291. The introduction of the gas standing under pressure also comprises the introduction of the compressed gas into the developing container bubble as well as the introduction of compressed gas into the preform at the beginning of the blowing process. Other fluids are also known for the blowing formation, in particular also the use of the filling material to be filled into the finished container as blowing fluid.

The basic construction of a blowing station for the formation of containers is described in DE-OS 42 12 583. Possibilities for the tempering of the preforms are explained in DE-OS 23 52 926.

During the processes of production in filling, it is necessary to convey the containers and pass them between the individual process stages from one station to the other. Inside the device for the blow-forming the preforms and the blowing containers can be conveyed with the aid of different handling devices. The use of conveyor mandrels onto which the preforms are set has proven itself in particular. However, the preforms can also be handled with other carrier devices. The use of grasping pincers for managing preforms in the use of spreading mandrels which can be introduced for retention into a opening area of the preform also belong to the available constructions.

An exemplary device with carrier elements for conveying the preforms and containers is known from EP 2 753 465 A1. The device in it for the blow-forming of finished containers comprises a heating stretch for heating preforms consisting of a thermoplastic material with several heating devices arranged along the heating stretch and is provided with a blowing device as a deforming device. The blowing device comprises several blowing stations arranged on a rotatable blowing wheel for deforming the preforms to the finished containers and comprises retention devices for retaining and conveying the preforms. The retention devices shown in EP 2 753 465 A1 comprise in the area of their head, which can be introduced into a opening section of the preform, several, namely, at least two clamping elements which can be positioned and are shaped at least in areas in a rounded manner and are arranged along an outer circumference of the head with an interval relative to each other which are, therefore, arranged at a circumferential distance from each other. At least one of the clamping elements is positioned in a recess arranged laterally on the head relative to a longitudinal axis of the retention device, wherein the recess comprises upper and lower sliding surfaces running obliquely to the longitudinal axis loading the clamping element, and wherein the head comprises a lower head part provided with the lower sliding surface and comprises an upper head part provided with the upper sliding surface. These described details of the formation of the clamping elements and of the retention device can also be provided optionally and with the advantages indicated in EP 2 763 465 A1 in the following explained invention. The preform is formed here in the area of its opening section substantially with a cylindrical inner surface.

Other suitable clamping elements for conveying preforms are described, e.g., in DE 10 2005 011 805 A1 and DE 10 2008 023 701 A1.

The conveyor mandrels used for a conveying of the preforms must be regularly replaced, for example, for changing the device for the blow-forming production of finished containers to another type of preform or for the replacement of worn or dirty parts.

The replacement of the conveyor mandrels is relatively expensive and must be manually carried out. In order to reduce the expense of the work necessary for the replacement of the conveyor mandrels, a stable conveyor system with conveyor mandrels for preforms and which can be replaced by machine would be desirable.

DESCRIPTION OF THE INVENTION

This problem is solved by the invention by a conveyor system for conveying preforms in a device for the blow-forming production of finished containers, wherein the conveyor system comprises a conveyor chain whose chain links comprise a carrier element and a conveyor element, wherein the conveyor system is characterized in that the conveyor element comprises a placing structure and the carrier element comprises a mounting structure and the placing structure and the mounting structure are designed and arranged at least in sections so that they are complementary in shape relative to one another, wherein the placing structure of the conveyor element and the mounting structure of the carrier element each comprise at least one connection element which are designed and arranged to be complementary in shape relative to one another at least in sections. Furthermore, the conveyor system is preferably designed to transfer the preforms onto carrier elements for being conveyed through a heating stretch and for removing the preforms from the carrier elements after the conveying of the preforms through the heating stretch.

The present invention starts from the recognition that a two-part formation of the chain links and a stable retention between the two parts by a connection element offer the advantage of a simpler ability to replace the carrier element with a simultaneous stability during the running operation. The connection between the two parts, for example, in combination with a magnetic retention, can realize a high retention power with a strong, planar contact between carrier element and conveyor element, so that the requirements for a reliable conveying of the container are met.

As used here, the concept "container" comprises both container preforms, also called preforms or preform in short in the following as well as the products produced from them, which are designated as finished containers in order to better delineate them from the more general concept of the container.

The conveyor system comprises a conveyor chain with chain links. In addition to the conveyor chain, the conveyor system can comprises other conveyor elements such as, for example, other conveyor chains, or transfer elements such as, for example, transfer wheels.

Each chain link is formed at least in two parts, a conveyor element and a carrier element. This means that the chain link is not shaped in one part and therefore can be readily broken down manually or automatically into conveyor element and carrier element. In this manner, individual elements of the chain link such as, e.g., the carrier elements, can be rapidly and readily exchanged.

In a preferred embodiment the carrier element is also multipartite, for example, constructed in at least two parts. Therefore, a preferred carrier element comprises, for example, at least one element base and a replaceable and/or movable holder element. Whereas the element base is connected by the mounting structure to the transport element, the holder element is arranged for retaining and/or receiving and dispensing the preforms.

The conveyor system is suitable for being used in a device for the blow-forming production of finished containers for the conveying of preforms. In particular, the conveyor system is designed for transferring the preforms onto carrier elements for being conveyed through a heating stretch and for the removal of the preforms from the carrier elements after the conveying of the preforms through the heating stretch. This means that the preforms preferably remain on or at the carrier element only for the duration of the conveying through the heating stretch, i.e., are held by the carrier element, and are removed from the carrier element after having passed through the heating stretch in order to be supplied, e.g., to other carrier elements.

The transfer and the removal of the preforms can be carried out by known methods and devices, for example, by a transfer wheel and the like.

The placing structure is preferably substantially planar, aside from the connection elements and stabilizing elements described herein. Alternatively, the placing structure can also be formed in a structured manner in order to further reduce the risk of a slipping of the mounting structure opposite the placing structure. Like the placing structure, the mounting structure is also preferably substantially planar, aside from the connection elements and stabilizing element contained in it. Alternatively, it can also be designed to be structured, as described above for the placing structure, in order to minimize the risk of slipping.

The placing structure and the mounting structure are formed and arranged at least in sections in a manner complementing the shape of each other. This ensures that the mounting structure is optimally detected by the magnetic field of the placing structure and that in addition, the two structures are secured against slipping.

The placing structure of the conveyor element and the mounting structure of the carrier element each comprises at least one connection element which is also constructed and arranged at least in sections in a manner complementing the shape of each other. This means that a connection element in the mounting structure is designed to complement the shape of a connection element in the placing structure.

The connection elements in the placing structure and the mounting structure are suitable for connecting the conveyor element and the carrier element so firmly to one another that a secure conveying of preforms on the carrier element through the heating stretch is ensured. At the same time, the connection elements are constructed in such a manner that they make possible the separation of the conveyor element and the carrier element, preferably a manual separation by a trained specialist.

The connection element is preferably a locking element. A locking element is capable of preventing a slipping or loosening of the conveyor element and the carrier element against one another or from one another in that two complementary connection elements engage in one another in a hook-like manner, i.e., are curved with a corner.

The connection element in the placing structure can preferably be suspended in the connection element in the mounting structure or vice versa. The connection element in the placing structure of the conveyor element can be, for example, a pin with a T profile in the longitudinal direction of the pin and the connection element in the mounting structure of the carrier element can be a slot with a T-groove profile, wherein the slot is open in the longitudinal direction of the carrier element so that the pin can be suspended in the slot.

Furthermore, the placing structure of the conveyor element preferably comprises at least one magnet. The magnet or magnets are arranged in the conveyor element in such a manner that a magnetic field is made available in the area of the placing structure. The magnet or magnets of the conveyor element can be permanent magnets and/or electromagnets. In addition to the magnets, ferromagnetic inserts can be arranged in order to influence the magnetic field in the conveyor element.

The magnetic forces of the magnet preferably act substantially vertically to the placing structure on the carrier element and the mounting structure, that is, in the direction of the mounting structure. In particular, the magnetic field can be designed in such a manner that the magnetic field lines primarily vertically intersect the placing structure (e.g., at 60% or more, 70% or more, or 80% or more). This ensures a sufficiently strong retention force for the carrier element.

The conveyor element itself can consist of a non-magnetic, paramagnetic or diamagnetic material. In preferred embodiments the conveyor element consists of steel and/or iron. The magnet or magnets can be placed in suitable recesses of the conveyor element.

The mounting structure of the carrier element preferably contains a ferromagnetic material such as, e.g. iron, and/or at least one magnet which is attracted by the magnetic field of the placing structure.

It is understood that the arrangement of the magnetic field and of the magnetic material inside the two elements of the chain link can also be inverted. Therefore, in an alternate embodiment the mounting structure of the carrier element comprises at least one magnet whereas the placing structure of the conveyor element preferably contains a ferromagnetic material such as, e.g. iron and/or at least one magnet which is attracted by the magnetic field of the mounting structure.

Furthermore, the placing structure of the conveyor element and the mounting structure of the carrier element each comprises at least one stabilizing element which are designed and arranged complementary in shape relative to one another at least in sections. This means that a stabilizing element in the mounting structure is designed complementary to the shape of a stabilizing element in the placing structure. The conveyor system can be secured, for example, against a sliding of the carrier element opposite the conveyor element by the stabilizing elements.

The at least one stabilizing element in the placing structure of the conveyor element can be, for example, an extrusion in the placing structure and the at least one stabilizing element in the mounting structure of the carrier element can be an indentation in the mounting structure which has a complementary shape.

The magnet or magnets in the placing structure cooperate in such a manner with a ferromagnetic material and/or the magnet or the magnets in the mounting structure that a magnetic attraction force acts between the mounting structure and the placing structure. The carrier element and the conveyor element are substantially held together by this magnetic attraction force. Of course, this does not exclude that the holding together of the carrier element and of the conveyor element is reinforced and/or stabilized by connection elements and stabilizing elements.

In order to separate the connection between the placing structure and the mounting structure the carrier element can be bent in a suitable direction from the conveyor element and separated by the force of traction. This overcomes the connection between the connection elements and optionally also the magnetic force acting between the structures.

An automated mounting and dismounting of carrier elements is also possible by the connection by the connection elements and optionally by a magnetic retention of the carrier element and/or of the mounting structure on the placing structure.

The thermal expansion coefficients of the placing structure of the conveyor element and of the mounting structure of the carrier element are preferably coordinated with each other in such a manner that a support in the operating temperature range which is as free of tension as possible is given.

The invention also relates to a device for the blow-forming production of finished containers from preforms, in particular from preforms consisting of a thermoplastic material, with at least one heating device for the thermal conditioning of the preforms along a conveyor stretch, and with at least one deforming device for deforming thermally conditioned preforms into the finished container, characterized in that the device comprises at least one conveyor system according to the invention for conveying the preforms, wherein the conveyor system is arranged in particular in the area of the heating device. The heating device comprises a heating stretch.

As regards the blowing stations used, different embodiments are known. In blowing stations which are arranged on rotating conveyor wheels, namely, on a so-called blow wheel, the form carriers can frequently be folded up like a book. However, it is also possible to use form carriers which are guided in a shiftable manner relative to each other or in some other way. In the case of stationary blowing stations, which are especially suitable for receiving several cavities for the formation of containers, plates which are arranged parallel to each other are typically used as form carriers.

The already explained handling of the preforms takes place on the one hand in the so-called two-stage methods in which the preforms are first produced in an injection-molding method, subsequently intermediately stored and only later conditioned regarding the temperature and inflated to a finished container. On the other hand, an application takes place in the so-called one-stage methods in which the preforms are suitably tempered immediately after their production using injection-molding technology and after a sufficient hardening and are subsequently inflated.

The invention also relates to the using of a conveyor system according to the invention in a device for the blow-forming production of finished containers from preforms, in particular from preforms consisting of a thermoplastic material, with at least one heating device for the thermal conditioning of the preforms along a conveyor stretch and with at least one deforming device for deforming thermally conditioned preforms to the finished container, wherein the usage takes place in particular in the area of the heating device.

In addition, the invention also relates to a method for replacing at least one carrier element of a conveyor system according to the invention in which the carrier element of the conveyor system is separated from the conveyor element of the transport system and replaced by another carrier element.

SHORT DESCRIPTION OF THE FIGURES

The drawings schematically show an exemplary embodiment of the invention. In the figures.

EXEMPLARY EMBODIMENTS

Other advantages, characteristics and features of the present invention will become clear in the following detailed description of exemplary embodiments using the attached drawings. However, the invention is not limited to these exemplary embodiments.

Figure 1:
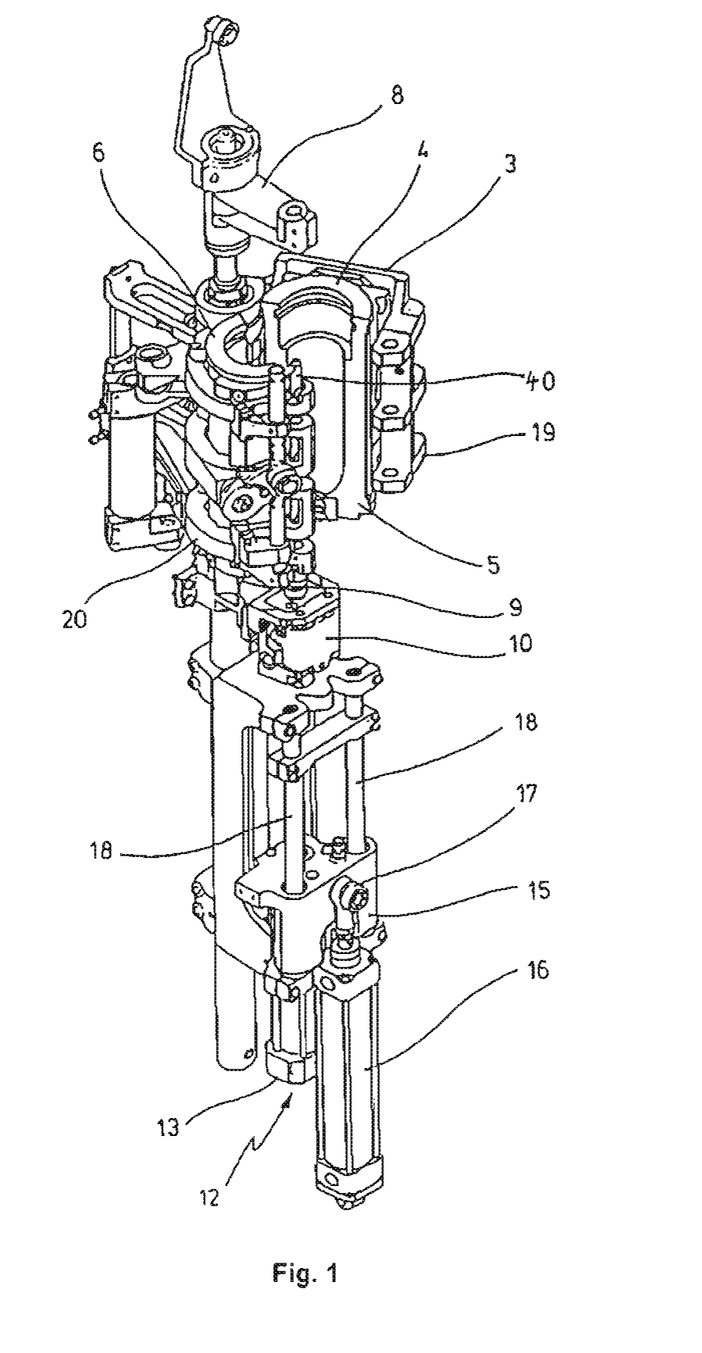
FIG. 1 Shows a perspective view of a blowing station for producing containers from preforms.
Figure 2:
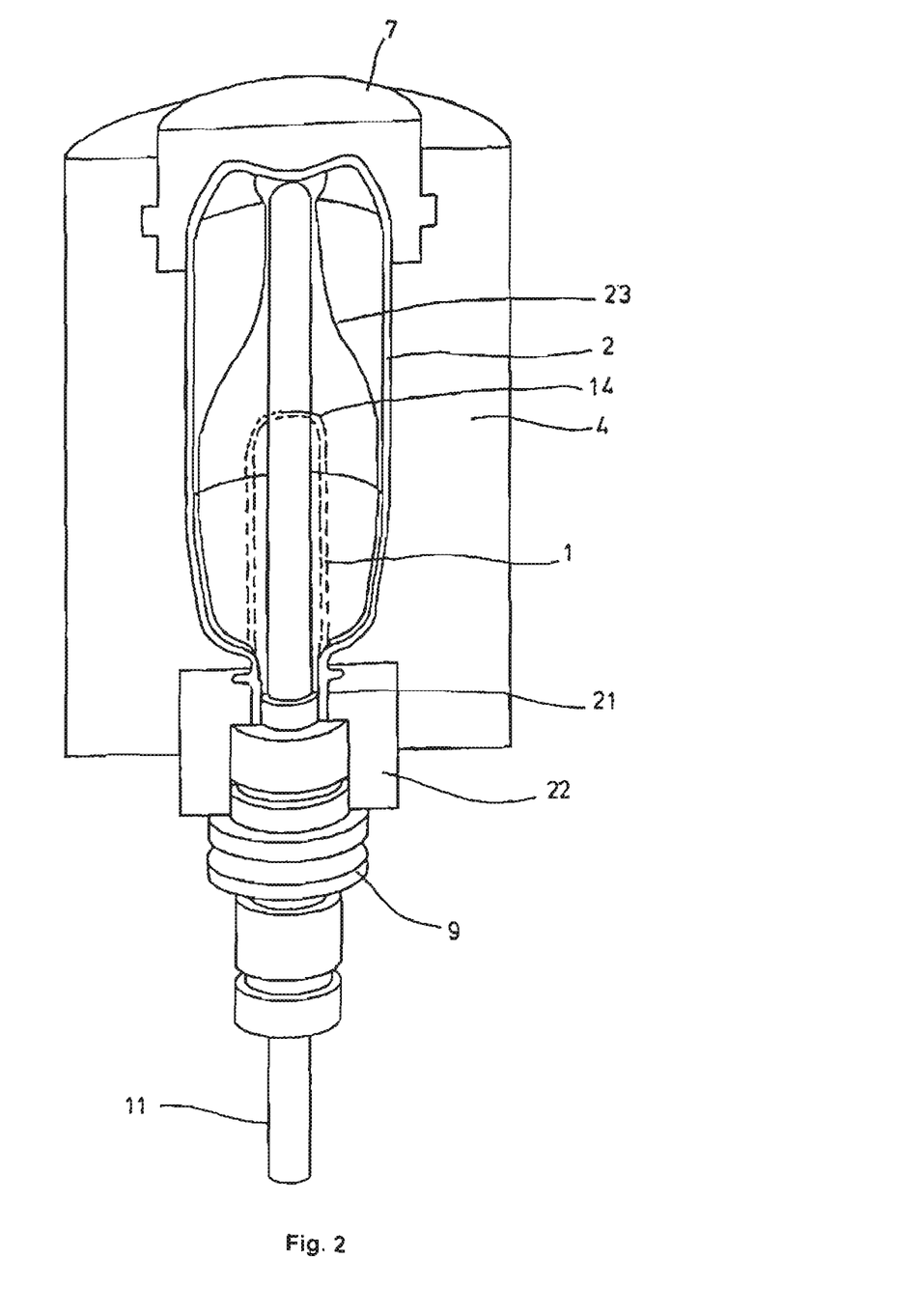
FIG. 2 Shows a longitudinal section through a blowing mold in which a preform is stretched and expanded.

The basic construction of a device for deforming preforms 1 to containers 2 is shown in FIG. 1 and in FIG. 2. The arrangement can be as shown or can be rotated in a vertical plane through 180° C.

The device for forming the container 2 consists substantially of a blowing station 3 which is provided with a blowing mold 4 into which a preform 1 can be inserted. The preform 1 can be an injection-molded part consisting of polyethylene terephthalate. In order to make it possible to insert the preform 1 into the blowing mold 4 and to make possible a removal of the finished container 2, the blowing mold 4 consists of mold halves 5, 6 and a bottom part 7 which can be positioned by a lifting device 8. The preform 1 can be fixed in the area of the blowing station 3 by a retention element 9. For example, it is possible to insert the preform 1 directly into the blowing mold 4 with pincers or other handling means.

In order to make a compressed air supply line possible, a connection piston 10 is arranged underneath the blowing mold 4 and which supplies compressed air to the preform 1 and simultaneously performs a sealing. However, in a modified construction it is also basically conceivable to use fixed compressed air supply lines.

A stretching of the preform 1 takes place in this exemplary embodiment with the aid of a stretching rod 11 which is positioned by a cylinder 12. According to another embodiment a mechanical positioning of the stretching rod 11 takes place via a curved segment which is loaded by tap rollers. The using of curved segments is especially advantageous if a plurality of blowing stations 3 are arranged on a rotating blow wheel 25.

In the embodiment shown in FIG. 1 the stretching system is constructed in such a manner that a tandem arrangement of two cylinders 12 is made available. The stretching rod 11 is first moved by a primary cylinder 13 at the beginning of the actual stretching process into the area of a bottom 14 of the preform 1. During the actual stretching process the primary cylinder 13 is positioned with extended stretching rod together with a carriage 15 carrying the primary cylinder 13 by a secondary cylinder 16 or via a cam control. In particular, the secondary cylinder 16 can be used in such a manner with a cam control that a current stretching position is given by a guide roller 17 which slides along a cam track during the execution of the stretching process. The guide roller 17 is pressed by the secondary cylinder 16 against the guide track. The carriage 15 slides along two guide elements 18.

After a closing of the mold halves 5, 6 arranged in the area of carriers 19, 20 a locking of the carriers 19, 20 takes place relative to one another with the aid of a locking device 40.

In order to adapt to different shapes of a opening section 21 of the preform 1, the using of separate threaded inserts 22 is provided according to FIG. 2 in the area of the blowing mold 4.

FIG. 2 shows, additionally to the inflated container 2, the preform 1 also sketched in dotted lines and schematically shows a developing container bubble 23.

Figure 3:
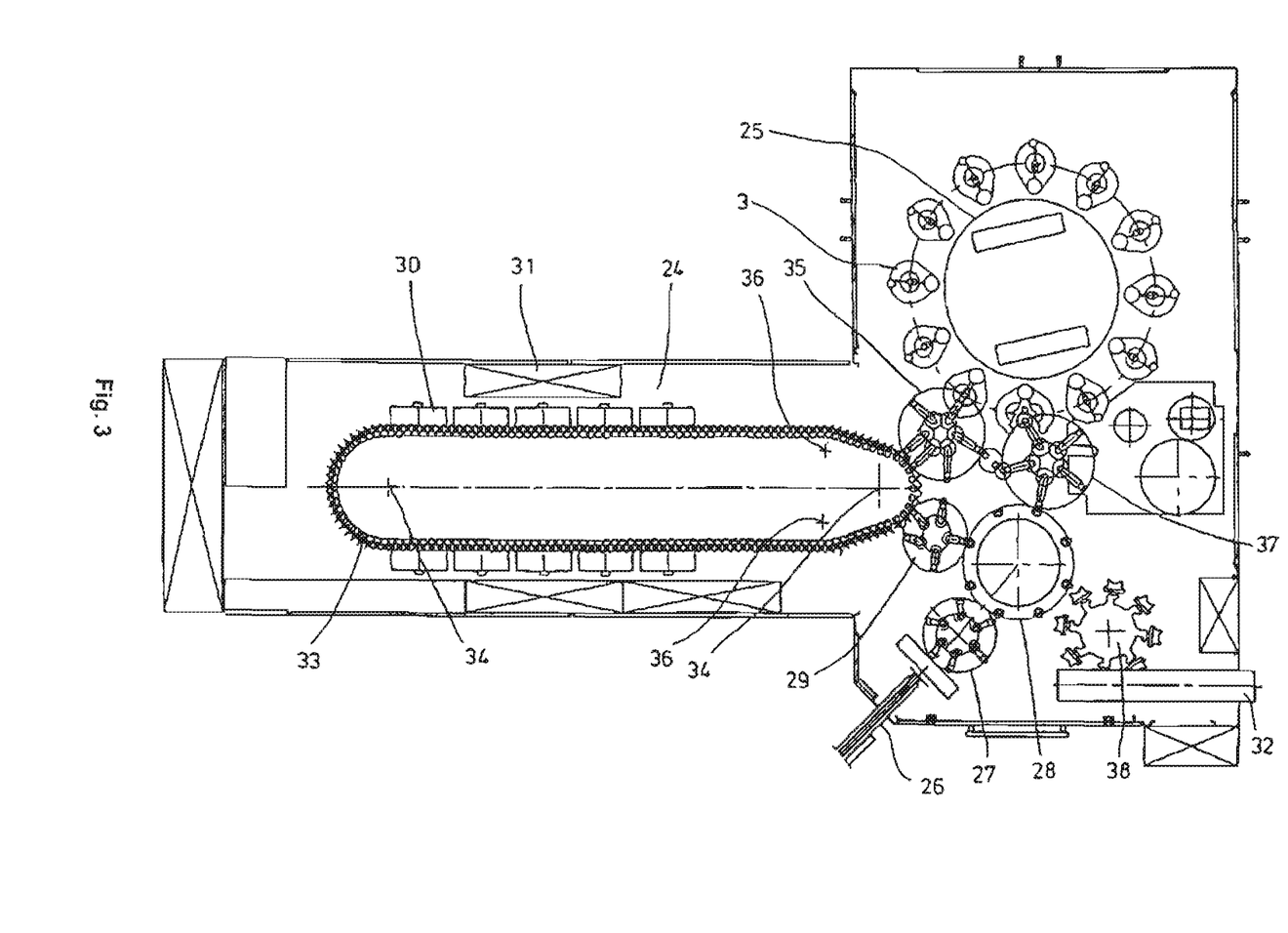
FIG. 3 Shows a sketch for illustrating a basic construction of a device for the blow-forming of containers.

FIG. 3 shows the basic construction of a blowing machine which is provided with a heating stretch 24 and a rotating blow wheel 25. Starting from an introduction 26 of a preform, the preforms 1 are transported by transfer wheels 27, 28, 29 into the area of the heating stretch 24. Heating radiators 30 and blowers 31 are arranged along the heating stretch 24 in order to temper the preforms 1. After a sufficient tempering of the preforms 1, they are transferred from a transfer wheel 35 onto the blow wheel 25 in the area of which the blowing stations 3 are arranged. The finished, blowing containers 2 are supplied by other transfer wheels 37, 28, 38 to a discharge stretch 32. The transfer wheel 37 is constructed here as a removal wheel and the transfer wheel 38 as a discharge wheel.

In order to be able to deform a preform 1 into a container 2 in such a manner that the container 2 has material qualities that ensure a long service life of food filled inside the container 2, in particular beverages, special method steps must be observed during the heating and orientation of the preforms 1. In addition, advantageous effects can be achieved by observing special dimensioning regulations.

Different plastics can be used as thermoplastic material. For example, PET, PEN or PP can be used.

The expansion of the preform 1 during the orientation procedure takes place by the supplying of compressed air. The supply of compressed air is divided into a pre-blowing phase in which the gas, for example compressed air, is supplied with a low-pressure level and into a subsequent main blowing phase in which the gas is supplied with a higher pressure level. During the pre-blowing phase, compressed air with a pressure in between 10 bar to 25 bar is typically used, and during the main blowing phase compressed air with a pressure between 25 bar to 40 bar is supplied.

It can also be recognized from FIG. 3 that in the embodiment shown the heating stretch 24 is formed by a plurality of circulating conveyor elements 33 which are arranged on each other like a chain and are guided along deflection wheels 34, 36. In particular, it is ensured that a substantially rectangular base contour is set by the chain-like arrangement. In the embodiment shown, in the area of the expansion of the heating stretch 24 facing the transfer wheel 27 a single, relatively large deflection wheel 34 is used, and in the area of adjacent deflections two comparatively smaller deflection wheels 36 are used. However, basically even any other guides are conceivable.

In order to make possible the tightest possible arrangement of the transfer wheel 27 and of the blowing wheel 25 relative to one another, the arrangement shown proves to be especially advantageous since in the area of the corresponding extension of the heating stretch 24, three deflection wheels 34, 36 are positioned, namely, the smaller deflection wheels 36 in the area of the transfer to the linear courses of the heating stretch 24 and the larger deflection wheel 34 in the direct transfer area to the transfer wheel 27 and to the blowing wheel 25. As an alternative to using chain-like conveyor elements 33, it is also possible, for example, to use a rotating heating wheel.

Figure 4:
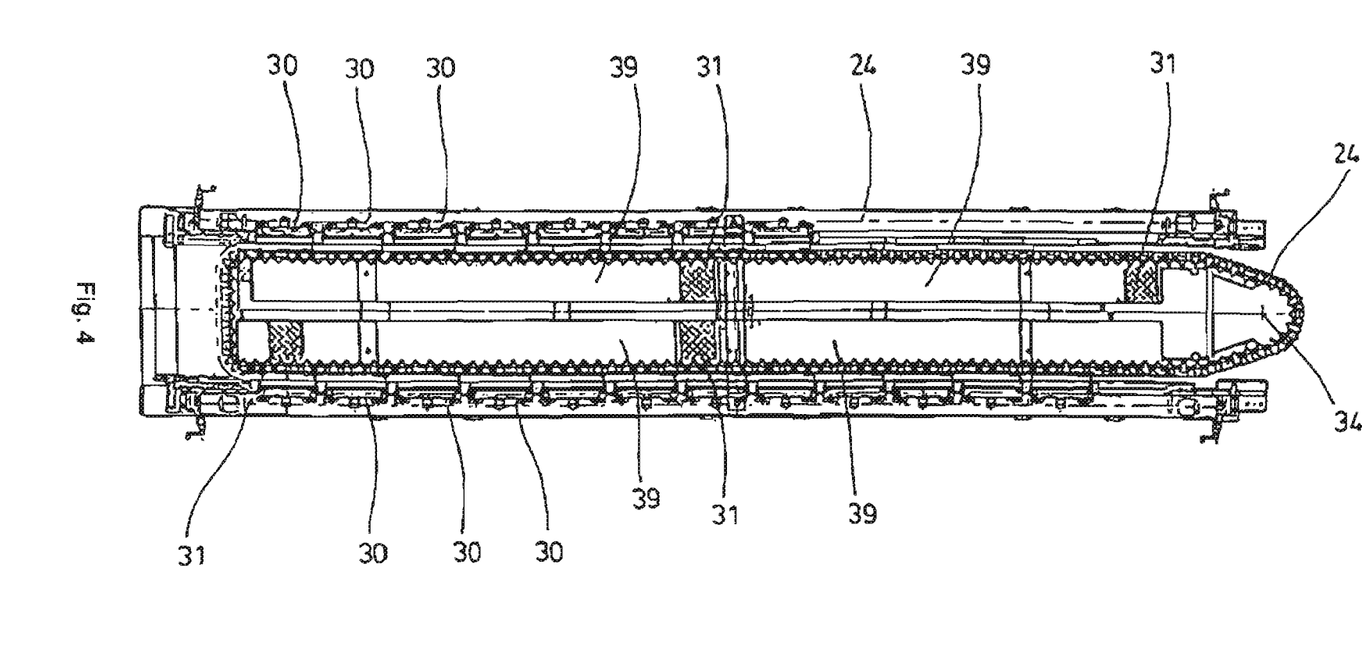
FIG. 4 Shows a modified heating stretch with an increased heating capacity.

After a completed blowing of the containers 2, they are moved out of the area of the blowing stations 3 by the transfer wheel 38 and transported to the discharging stretch 32. In the modified heating stretch 24 shown in FIG. 4, a larger amount of preforms 1 can be tempered per time unit. The blowers 31 conduct cooling air here into the area of cooling air conduits 39 located opposite the associated heating radiators 30 and discharge the cooling air via outflow openings. The arrangement of the outflow directions brings about a flow direction for the cooling air substantially transversely to a transport direction of the preforms 1. The cooling air conduits 39 can make reflectors available for the radiation of heat in the area of the surfaces opposite the heating radiators 30. In addition, it is possible to also realize a cooling of the heating radiators 30 by the cooling air which is given off.

A conveying of the preforms 1 and of the containers 2 through the blowing machine can take place in different ways. According to a variant of an embodiment, the preforms are carried by conveyor mandrels at least along the significant part of their conveyor path. However, it is also possible to carry out a conveying of the preforms using pincers which attack the preform on the outside or to use inside mandrels which are introduced into a opening area of the preform. Different variants are also conceivable with respect to the spatial orientation of the preforms.

According to a variant, the preform is supplied with its opening oriented upward in a vertical direction in the area of the preform introduction 26, is subsequently rotated, transported along the heating stretch 24 and the blowing wheel 25 with its opening oriented downward in a vertical direction, and is rotated again before reaching the discharge stretch 32. According to another variant, the preform 2 is heated in the area of the heating stretch 24 with its opening oriented downward in a vertical direction before reaching the blowing wheel 25 but is rotated again through 180°.

According to a third variant of an embodiment the preform runs through the entire area of the blowing machine without making turning movements with its opening oriented upward in a vertical direction.

Figure 5:
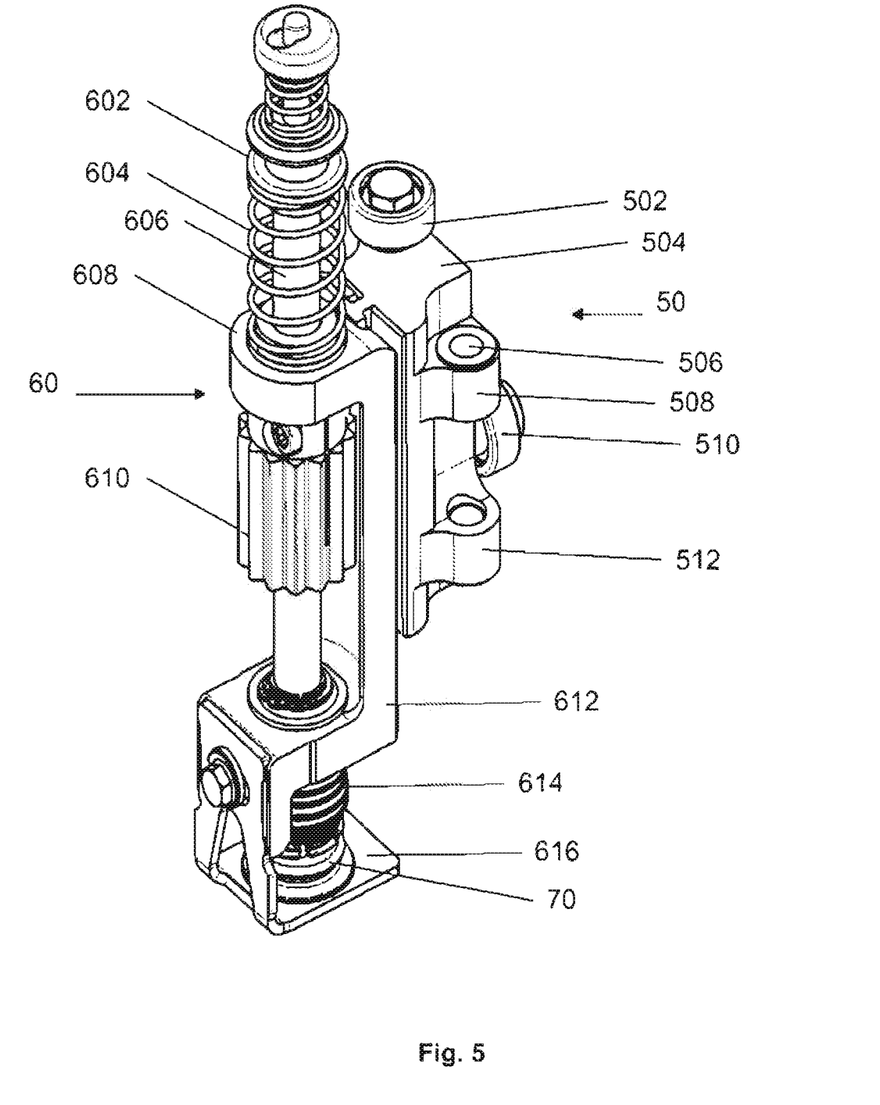
FIG. 5 Shows a spatial view of the assembled chain link and/or of the conveyor mandrel.

FIG. 5 shows the basic construction of the chain link and of the conveyor mandrel which conveys the preforms 1 to be heated through a heating stretch along heating elements, e.g., heating radiators 30. A spatial representation of the assembled chain link is shown. The chain link comprises a conveyor element 50 and a carrier element 60.

The conveyor element 50 shown comprises a guide roller 502 which prevents a lateral slipping of the conveyor element. The guide roller 502 can be guided, for example, on a guide rail during the circulating conveying of preforms 1 in a heating stretch. Furthermore, the conveyor element 50 comprises a conveyor roller 510 with which the chain link can be transported around the heating stretch. The transport roller 510 can rest, for example, on a conveyor belt. Finally, connection articulations 508, 512 and sliding casings 506 are shown with which the chain link is connected to the next chain link of the conveyor chain.

The carrier element 60 shown by way of example comprises an element basis 612, a head 614 facing the preform and comprises a shaft 606 connected to the head. The shaft 606 with the head 614 can move relative to the element base 612 in the direction of a longitudinal element axis. A base position of the shaft 606 relative to the element base 612 can be given by a spring 604. The spring 604 is arranged in the exemplary embodiment shown between a top side 608 of the element base 612 and between an end segment 602 projecting laterally over the shaft 606.

According to a typical exemplary embodiment, a plurality of conveyor elements 50 can be connected to each other in the manner of a chain or to a circulating conveyor chain. However, the conveyor element 50 can also be attached to circulating transfer wheels or to other devices.

In the assembled state of the chain link, the carrier element 60 and the conveyor element 50 are firmly connected to each other by connection elements and optionally by an additional stabilization by magnet power and/or stabilizing elements. The connection between carrier element 60 and conveyor element 50 is sufficiently firm to prevent a separation and a slipping of the elements during the conveying of the preforms 1, in particular of the conveying in the blowing station and the heating stretch 24. At the same time, the connection is loose enough to make the replacement of the carrier element 60 possible. Preferred connection elements and magnetic field strengths which meet these criteria are described herein and can be determined by a professional by standard test methods.

Since the placing structure 520 of the conveyor element 50 and the mounting structure 620 of the carrier element are constructed at least in sections to complement the shape of each other and are firmly connected to each other by locking elements and optionally by magnet power, there is preferably substantially no space between the sections of the placing structure 520 and the mounting structure, which sections complement the shape of each other in the assembled state.

Figure 6:
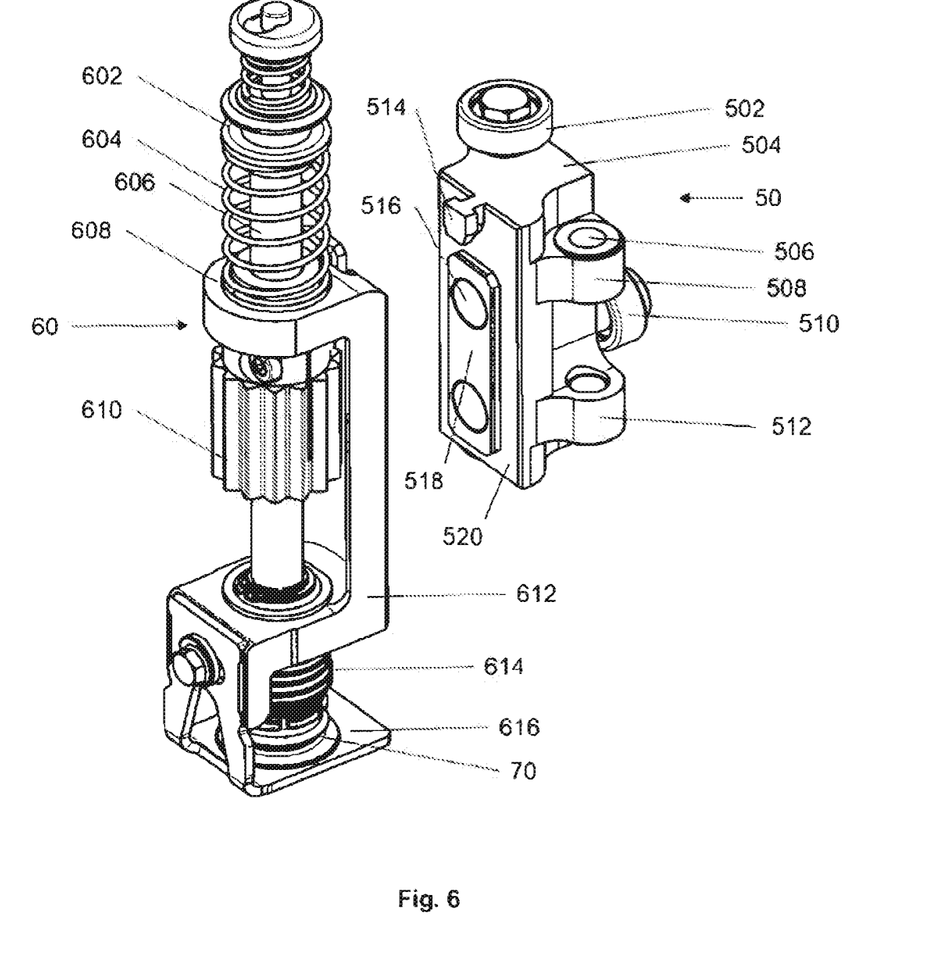
FIG. 6 Shows a spatial view of the disassembled chain link and/or of the conveyor mandrel.
Figure 7:
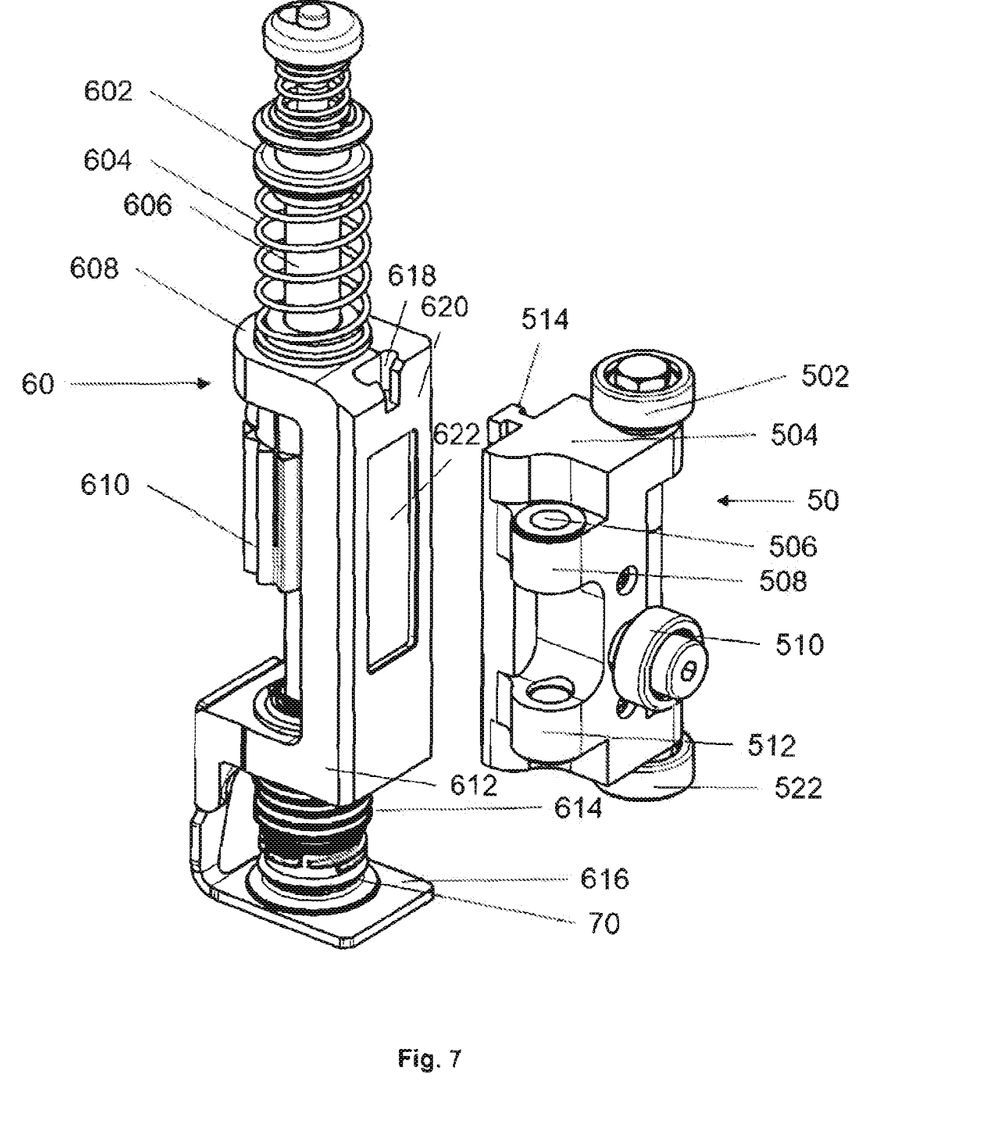
FIG. 7 Shows another spatial view of the disassembled chain link and/or of the conveyor mandrel.

FIGS. 6 and 7 show for further clarification the basic construction of the disassembled chain link which conveys the preforms 1 to be heated along heating elements, e.g., heating radiators 30. Spatial views of the disassembled chain link are shown. The chain link comprises a conveyor element 50 and a carrier element 60. As shown in FIGS. 6 and 7, a section of the placing structure 520 is configured to contact a section of the mounting structure 620 laterally with respect to a longitudinal axis of the preform when the preform is carried by the carrier element.

FIG. 6 shows that the conveyor element 50 comprises a placing structure 520. The placing structure 520 is preferably constructed at least in sections to be complementary to the shape of the mounting structure 620 of the carrier element. The placing structure 520 shown comprises at least one magnet 516, for example, as shown in FIG. 6, two magnets 516. The magnets 516 are attached vertically above one another in the longitudinal direction of the conveyor element in the example shown. Alternatively, the magnets 516 can also be distributed in another arrangement over the placing structure 520 of the conveyor element 50. The magnets 516 does not have to be directly attached to the surface of the placing structure 520 but rather can also be covered by the placing structure 520 as long as it is ensured that a magnetic field is made available on the placing structure 520 which ensures a sufficiently strong bonding of the carrier element 60 on the conveyor element 50.

In addition, it can be recognized from FIG. 6 that the placing structure 520 shown comprises a connection element shaped like pin 514 with a T profile. The pin 514 is constructed in sections to be complementary to the shape of the slot 618 with a T-groove profile recognizable in FIG. 7.

Furthermore, the placing structure 520 shown by way of example comprises a stabilizing element shaped like extrusion 518 in the placing structure. The extrusion 518 shown is substantially rectangular and comprises the two magnets 516.

It can be recognized from FIG. 7 that the carrier element 60 comprises a mounting structure 620. The mounting structure 620 is preferably complementary at least in sections to the shape of the placing structure 520 of the conveyor element. The mounting structure contains a ferromagnetic material such as, e.g., iron, and/or at least also a magnet which is attracted by the magnetic field of the placing structure. The mounting structure 620 shown in FIG. 7 consists of a ferromagnetic material.

Furthermore, it is apparent from FIG. 7 that the mounting structure 620 shown comprises a connection element shaped as slot 618 with a T groove profile. The slot 618 is complementary in sections to the shape of the pin 514 with a T profile which can be recognized in FIG. 6. It can be recognized that the pin 514 can be suspended in the slot 618. The suspending of the pin 514 in the slot 618 establishes a fixed connection between the conveyor element 50 and the carrier element 60 and the two elements are also secured in particular against slipping.

Furthermore, the mounting structure 620 shown by way of example in FIG. 7 comprises a stabilizing element shaped as a recess 622 in the mounting structure 620. The recess 622 shown is, like the extrusion 518, substantially rectangular and therefore complementary to the shape of the extrusion 518. The engagement of the extrusion 518 into the recess 622 during the bringing together of the carrier element 60 and the conveyor element 50 reinforces the connection between the two elements and also in particular secures them against slipping.

Although the present invention was described in detail using the exemplary embodiments, it is obvious for a person skilled in the art that the invention is not limited to these exemplary embodiments but rather modifications are possible in such a manner that individual features are omitted or other combinations of the individual features presented can be realized in as far as the protective scope of the attached claims is not departed from. The present disclosure includes all combinations of the individual features presented.

LIST OF REFERENCE NUMERALS

1 Preform
2 Container
3 Blowing station
4 Blowing mold
5 Mold half
6 Mold half
7 Bottom part 8 Lifting device
9 Holding element
10 Connection piston
11 Stretching rod
12 Cylinder
13 Primary cylinder
14 Bottom of the preform
15 Carriage
16 Secondary cylinder
17 Guide roller
18 Guide element
19 Carrier
20 Carrier
21 Opening section
22 Threaded insert
23 Container bubble
24 Heating stretch
25 Blowing wheel
26 Preform introduction
27 Transfer wheel
28 Transfer wheel
29 Transfer wheel
30 Heating radiator
31 Blower
32 Discharge stretch
33 Conveyor elements
34 Deflection wheel
35 Transfer wheel
36 Deflection wheel
37 Transfer wheel
38 Deflection wheel
39 Cooling air conduits
40 Locking device
50 Conveyor element
60 Carrier element
70 Preform opening section
502 Guide roller
504 Top of the conveyor element
506 Sliding casing
508 Connection articulation
510 Conveyor roller
512 Connection articulation
514 Pin with T profile
516 Magnet
518 Exclusion in the placing structure
520 Placing structure
602 End segment
604 Spring
606 Shaft
608 Top side of the element base
610 Gear
612 Element base
614 Head
616 Radiation orifice
618 Slot with T groove profile
620 Mounting structure
622 Recess

The invention claimed is:

1. A conveyor system for conveying a preform having a longitudinal axis through a heating section of a device for blow-forming the preform into a finished container, the conveyor system comprising:
a conveyor chain having chain links that comprise a carrier element; and
a conveyor element;
wherein the conveyor element comprises a placing structure,
wherein the carrier element comprises a mounting structure,
wherein a section of the placing structure is complementary in shape to a section of the mounting structure,
wherein the placing structure comprises at least one connection element having a section that is complementary in shape relative to a section of at least one connection element of the mounting structure,
wherein the carrier element is configured to carry the preform while the preform is conveyed through the heating section and to release the preform after the preform has been conveyed through the heating section, and
wherein the section of the placing structure is configured to contact the section of the mounting structure laterally with respect to the longitudinal axis of the perform when the preform is carried by the carrier element.

2. The conveyor system according to claim 1, wherein the at least one connection element of the placing structure is configured to engage with the at least one connection element of the mounting structure in a locking manner.

3. The conveyor system according to claim 1, wherein the conveyor element comprises at least one magnet that has a magnetic field in the section of the placing structure, and wherein the mounting structure comprises one or both of a ferromagnetic material and a magnet which is attracted by the magnetic field in the section of the placing structure.

4. A conveyor system for conveying a preform through a heating section of a device for blow-forming the preform into a finished container, the conveyor system comprising:
a conveyor chain having chain links that comprise a carrier element; and
a conveyor element;
wherein the conveyor element comprises a placing structure,
wherein the carrier element comprises a mounting structure,
wherein a section of the placing structure is complementary in shape to a section of the mounting structure,
wherein the placing structure comprises at least one connection element having a section that is complementary in shape relative to a section of at least one connection element of the mounting structure,
wherein the carrier element is configured to carry the preform while the preform is conveyed through the heating section and to release the preform after the preform has been conveyed through the heating section,
wherein the connection element of the placing structure is a pin with a T profile in a longitudinal direction of the pin, and the connection element of the mounting structure is a slot with a T-groove profile, and
wherein the slot is open in a longitudinal direction of the carrier element such that the pin is suspendable in the slot.

5. The conveyor system according to claim 1, wherein the placing structure and the mounting structure each comprises at least one stabilizing element, and wherein at least a section of the at least one stabilizing element of the placing structure is complementary in shape relative to at least a section of the at least one stabilizing element of the mounting structure.

6. The conveyor system according to claim 5, wherein the at least one stabilizing element of the placing structure is an extrusion, and wherein the at least one stabilizing element of the mounting structure is an indentation which is complementary in shape to the extrusion.

7. A device for blow-forming a preform into a finished container, the device comprising:
- at least one heating section for heating the preform as it is conveyed through the at least one heating section,
- at least one deforming device for deforming the heated preform into the finished container; and
- at least one conveyor system according to claim 1 for conveying the preform through the at least one heating section.

8. The device according to claim 7, wherein the conveyor system is arranged in the device to carry the preform through the heating section after the preform has been transferred from a rotating transfer wheel to the carrier element of a chain link of the conveyor system, and to remove the preform using a second rotating transfer wheel after the preform has been conveyed through the heating section by the conveyor system.

9. A method for replacing at least one carrier element of a conveyor system according to claim 1, the method comprising:
- separating the carrier element from the conveyor element; and
- placing another carrier element on said conveyor element.

10. The conveyor system according to claim 4, wherein the section of the placing structure is configured to contact the section of the mounting structure laterally with respect to the longitudinal axis of the perform when the preform is carried by the carrier element.

11. A device for blow-forming a preform into a finished container, the device comprising:
- at least one heating section for heating the preform as it is conveyed through the at least one heating section,
- at least one deforming device for deforming the heated preform into the finished container; and
- at least one conveyor system according to claim 4 for conveying the preform through the at least one heating section.

12. The device according to claim 11, wherein the section of the placing structure is configured to contact the section of the mounting structure laterally with respect to the longitudinal axis of the perform when the preform is carried by the carrier element.

13. A method for replacing at least one carrier element of a conveyor system according to claim 4, the method comprising:
- separating the carrier element from the conveyor element; and
- placing another carrier element on said conveyor element.

14. The method according to claim 13, wherein the section of the placing structure is configured to contact the section of the mounting structure laterally with respect to the longitudinal axis of the perform when the preform is carried by the carrier element.

* * * * *